US011695567B2

(12) United States Patent
Chan

(10) Patent No.: US 11,695,567 B2
(45) Date of Patent: Jul. 4, 2023

(54) SECURING BLOCKCHAIN TRANSACTION BASED ON UNDETERMINED DATA

(71) Applicant: nChain Licensing AG, Zug (CH)

(72) Inventor: Ying Chan, London (GB)

(73) Assignee: nChain Licensing AG, Zug (CH)

( * ) Notice: Subject to any disclaimer, the term of this patent is extended or adjusted under 35 U.S.C. 154(b) by 526 days.

(21) Appl. No.: 16/604,534

(22) PCT Filed: Apr. 6, 2018

(86) PCT No.: PCT/IB2018/052407
§ 371 (c)(1),
(2) Date: Oct. 10, 2019

(87) PCT Pub. No.: WO2018/189634
PCT Pub. Date: Oct. 18, 2018

(65) Prior Publication Data
US 2020/0186360 A1    Jun. 11, 2020

(30) Foreign Application Priority Data
Apr. 10, 2017   (GB) ..................... 1705749

(51) Int. Cl.
*H04L 9/32* (2006.01)
*G06F 16/27* (2019.01)
(Continued)

(52) U.S. Cl.
CPC ............ *H04L 9/3247* (2013.01); *G06F 7/725* (2013.01); *G06F 16/27* (2019.01);
(Continued)

(58) Field of Classification Search
CPC ....... H04L 9/3247; H04L 9/0861; H04L 9/30; H04L 2209/38; H04L 2209/56;
(Continued)

(56) References Cited

U.S. PATENT DOCUMENTS

| 10,250,708 | B1 * | 4/2019 | Carver | ................. H04L 9/3297 |
| 2003/0123656 | A1 * | 7/2003 | Izu | ........................ G06F 7/725 |
| | | | | 380/30 |

(Continued)

FOREIGN PATENT DOCUMENTS

| CN | 104463001 A | 3/2015 |
| CN | 106411506 A | 2/2017 |

(Continued)

OTHER PUBLICATIONS

Alp et al., "Implementing External State Contracts—Feedback Requested," Jul. 25, 2013 [retireved Feb. 28, 2017], https://bitcointalk.org/index.php?topic=260898.30, 10 pages.

(Continued)

*Primary Examiner* — Abu S Sholeman
(74) *Attorney, Agent, or Firm* — Davis Wright Tremaine LLP

(57) ABSTRACT

Computer-implemented methods for locking a blockchain transaction based on undetermined data are described. The invention is implemented using a blockchain network. This may, for example, be the Bitcoin blockchain. A locking node may include a locking script in a blockchain transaction Node to lock a digital asset. The locking script includes a public key for a determined data source and instructions to cause a validating node executing the locking script to verify the source of data provided in an unlocking script by: a) generating a modified public key based on the public key for the determined data source and based on data defined in the unlocking script; and b) evaluating a cryptographic signature in the unlocking script based on the modified public key. The blockchain transaction containing the locking script is sent by the locking node to the blockchain network. The lock may be removed using a cryptographic signature generated from a private key modified based on the data.

12 Claims, 5 Drawing Sheets

(51) Int. Cl.
*G06F 7/72* (2006.01)
*G06Q 20/06* (2012.01)
*G06Q 20/36* (2012.01)
*G06Q 20/38* (2012.01)
*H04L 9/08* (2006.01)
*H04L 9/30* (2006.01)
*H04L 9/00* (2022.01)

(52) U.S. Cl.
CPC ..... *G06Q 20/0655* (2013.01); *G06Q 20/3674* (2013.01); *G06Q 20/3825* (2013.01); *G06Q 20/3829* (2013.01); *H04L 9/0861* (2013.01); *H04L 9/30* (2013.01); *G06Q 2220/00* (2013.01); *H04L 9/50* (2022.05)

(58) Field of Classification Search
CPC ....... H04L 9/3239; H04L 9/3066; H04L 9/08; H04L 9/32; G06F 7/725; G06F 16/27; G06F 7/72; G06Q 20/0655; G06Q 20/3674; G06Q 20/3825; G06Q 20/3829; G06Q 2220/00; G06Q 20/02; G06Q 20/065
See application file for complete search history.

(56) References Cited

U.S. PATENT DOCUMENTS

| | | | |
|---|---|---|---|
| 2006/0048132 A1* | 3/2006 | Chen | G06F 21/10 717/168 |
| 2016/0085955 A1 | 3/2016 | Lerner | |
| 2016/0098730 A1* | 4/2016 | Feeney | G06Q 20/20 705/71 |
| 2016/0162897 A1 | 6/2016 | Feeney | |
| 2016/0269182 A1 | 9/2016 | Sriram et al. | |
| 2016/0358165 A1 | 12/2016 | Maxwell | |
| 2017/0005804 A1 | 1/2017 | Zinder | |
| 2017/0085545 A1* | 3/2017 | Lohe | G06Q 20/065 |
| 2017/0220815 A1* | 8/2017 | Ansari | G06Q 20/36 |
| 2017/0288867 A1* | 10/2017 | Collier | H04L 9/3268 |

FOREIGN PATENT DOCUMENTS

| | | |
|---|---|---|
| EP | 1378821 A2 | 1/2004 |
| WO | 2015171580 A1 | 11/2015 |
| WO | 2017006136 A1 | 1/2017 |

OTHER PUBLICATIONS

Anonymous, "Hierarchical Deterministic Wallets—BIP32," retrieved from https://github.com/bitcoin/bips/blob/11b0fa37bee4eac40c3a1be0591078688bcc3392/bip-0032.mediawiki, Feb. 25, 2017, 9 pages.

Buterin, "Deterministic Wallets, Their Advantages and their Understated Flaws," retrieved from https://bitcoinmagazine.com/articles/deterministic-wallets-advantages-flaw-1385450276/, Nov. 26, 2013, 4 pages.

Edmunedgar, "[ANN] Reality Keys: an oracle letting you use external state in transactions," Bitcoin Forum, Jan. 20, 2014 [retrieved Feb. 5, 2018], https://bitcointalk.org/index.php?topic=423638.0, 12 pages.

Hearn, "Contract," retrieved from https://en.bitcoin.it/w/index.php?title=Contract&oldid=57322, Jul. 8, 2015, 11 pages.

Hearn, "Oracle Transactions," retirved from https://bitcointalk.org/index.php?topic=31635.0, Jul. 25, 2011, 7 pages.

International Search Report and Written Opinion dated Jul. 2, 2018, Patent Application No. PCT/IB2018/052407, 12 pages.

Killerstorm, "Now That Some of You People Got Rich, Can You Help Funding Development of Advanced Bitcoin Features, Like Escrow?" retrieved from https://www.reddit.com/r/Bitcoin/comments/1c02yf/now_that_some_of_you_people_got_rich_can_you_help/, Apr. 9, 2013, 26 pages.

Nakamoto, "Bitcoin: a Peer-to-Peer Electronic Cash System," Bitcoin, Oct. 31, 2008, https://bitcoin.org/bitcoin.pdf, 9 pages.

Satoshi et al., "Connection Limits," Bitcoin Forum, Aug. 9, 2010, https://bitcointalk.org/index.php?topic=741.0; prev_next=prev, 2 pages.

Todd, "Building Blocks of the State Machine Approach to Consensus," petertodd.org, Jun. 20, 2016 [retrieved Feb. 5, 2018], https://petertodd.org/2016/state-machine-consensus-building-blocks, 15 pages.

UK IPO Search Report dated Sep. 29, 2017, Patent Application No. GB1705749.8, 6 pages.

* cited by examiner

SECURING BLOCKCHAIN TRANSACTION BASED ON UNDETERMINED DATA

This invention relates generally to digital locks, and more particularly to methods and systems for locking a digital asset based on undetermined data from a determined data source. The invention is particularly suited, but not limited to, use in providing conditional unlocking of a digital asset on a blockchain network based on data not available to the locking party at the time of locking of the digital asset.

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. For example, the invention may be useful in other blockchain implementations which have similar limitations in signature verification as Bitcoin.

A blockchain is a consensus-based, electronic ledger which is implemented as a computer-based decentralised, distributed system made up of blocks which in turn are made up of transactions and other information. In the case of Bitcoin, each transaction that transfers control of a digital asset between participants in the blockchain system includes at least one input and at least one output. Each block contains a hash of the previous block so that blocks become chained together to create a permanent, immutable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Validity is determined, by the nodes, based on a common set of rules that are used by a majority of nodes with block generation power. For example, in the Bitcoin protocol, some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

A transaction output includes digital assets such as Bitcoins and a locking script, which may also be referred to as an encumbrance or a lock. The locking script locks the digital assets by specifying conditions that are required to be met in order to spend the output. For example, a locking script might require that certain data be provided in an unlocking script to unlock the associated digital assets. The traditional technique for requiring a locking party to provide data to unlock a digital asset involves embedding a hash of the data inside the locking script. However, this technique of locking and unlocking requires the data to be determined (i.e., known and fixed) at the time the locking script is created.

Thus, it is desirable to provide improved methods and devices which improve blockchain technology in one or more of these aspects.

Thus, in accordance with the present invention there is provided a method as defined in the appended claims.

As will be described in greater detail below, computer-implemented methods and electronic devices are configured for locking a transaction based on undetermined data.

Therefore, in accordance with the invention there may be provided a computer-implemented method (and corresponding system(s)). The method may be described as a security and/or control method. It may be arranged to control how and/or by whom an output in a blockchain transaction (TX) can be unlocked and spent via the blockchain network. Spending of the output enables a transfer of cryptocurrency to take place. The invention may provide a method (and corresponding system) arranged to modify a cryptographic public key embedded in the locking script of a blockchain transaction (Tx) with undetermined data provided in an unlocking script of another transaction. The invention may allow a blockchain transaction to be secured based on undetermined data. That is, the invention may allow a blockchain transaction to be locked based on data that is not available at the time the lock is applied to the blockchain transaction but that is expected to be available in the future.

A method in accordance with an embodiment of the invention may comprise: i) including, by a node in a blockchain network, a locking script in a transaction (i.e., a blockchain transaction) to encumber (i.e., lock) a digital asset associated with the transaction (i.e., the blockchain transaction), the locking script including a public key for a determined data source and including instructions to cause a validating node executing the locking script to verify the source of data provided in an unlocking script by: a) generating a modified public key based on the public key for the determined data source and based on data defined in the unlocking script; and b) evaluating a signature (i.e., a cryptographic signature) in the unlocking script based on the modified public key; and ii) sending, by the node, the transaction (i.e., the blockchain transaction) to the blockchain network.

In some implementations, the locking script further defines one or more data constraints and the locking script further includes instructions to cause the validating node to invalidate a transaction (i.e., a blockchain transaction) that includes the unlocking script when the one or more data constraints are not satisfied by the data. In some implementations, the one or more data constraints define one or more values and a comparison function which performs a comparison based the data and the one or more values.

In some implementations, the instructions that configure the validating node to evaluate the signature (i.e., a cryptographic signature) in the unlocking script based on the modified public key are configured to cause the validating node to invalidate the transaction (i.e., the blockchain transaction) that includes the unlocking script when the signature (i.e., the cryptographic signature) has not been generated using a modified private key associated with the determined data source. The modified private key may be generated by the determined data source based on a private key for the determined data source and based on the data.

In some implementations, the locking script is configured to cause the validating node to generate the modified public key by performing an operation that corresponds to an operation used to generate the modified private key.

In some implementations, the modified private key is a key that has been generated by performing a finite field arithmetic operation based on the data and the private key for the determined data source.

In some implementations, the instructions are configured to cause the validating node executing the locking script to generate the modified public key by performing an elliptic curve finite field arithmetic operation based on the data and the public key for the determined data source. In some implementations, the elliptic curve finite field arithmetic operation performs elliptic curve multiplication by scalar.

In some implementations, the locking script is further configured to include instructions for removal of the encumbrance (i.e., the lock) on the digital assets by the node after a defined time period.

In accordance with the invention, there may be provided a computer-implemented method comprising: a) generating, by a node, a modified private key based on data and a private key; b) generating a signature (i.e., a cryptographic signature) for a transaction referencing digital assets encumbered (i.e., locked) by a locking script using the modified private key; c) adding the (cryptographic) signature and the data to the (blockchain) transaction; and d) communicating the (blockchain) transaction to another node.

In some implementations, generating a modified private key comprises performing a finite field arithmetic operation on the data and the private key. In some implementations, the finite field arithmetic operation performs multiplication.

In some implementations, the locking script specifies a public key for a determined data source and includes instructions to cause a validating node executing the locking script to evaluate the source of data provided in an unlocking script by: a) generating a modified public key based on the public key for the determined data source and based on data defined in the unlocking script; and b) evaluating a signature (i.e., a cryptographic signature) in the unlocking script based on the modified public key.

In accordance with the invention, there may be provided an electronic device. The electronic device includes an interface device, a processor coupled to the interface device and a memory coupled to the processor. The memory has stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

In accordance with the invention, there may be provided a computer readable storage medium including a locking script comprising computer executable instructions which, when executed, configure a processor to perform functions of a locking script described herein.

These and other aspects of the present invention will be apparent from and elucidated with reference to, the embodiment described herein. An embodiment of the present invention will now be described, by way of example only, and with reference to the accompany drawings, in which.

Figure 1:
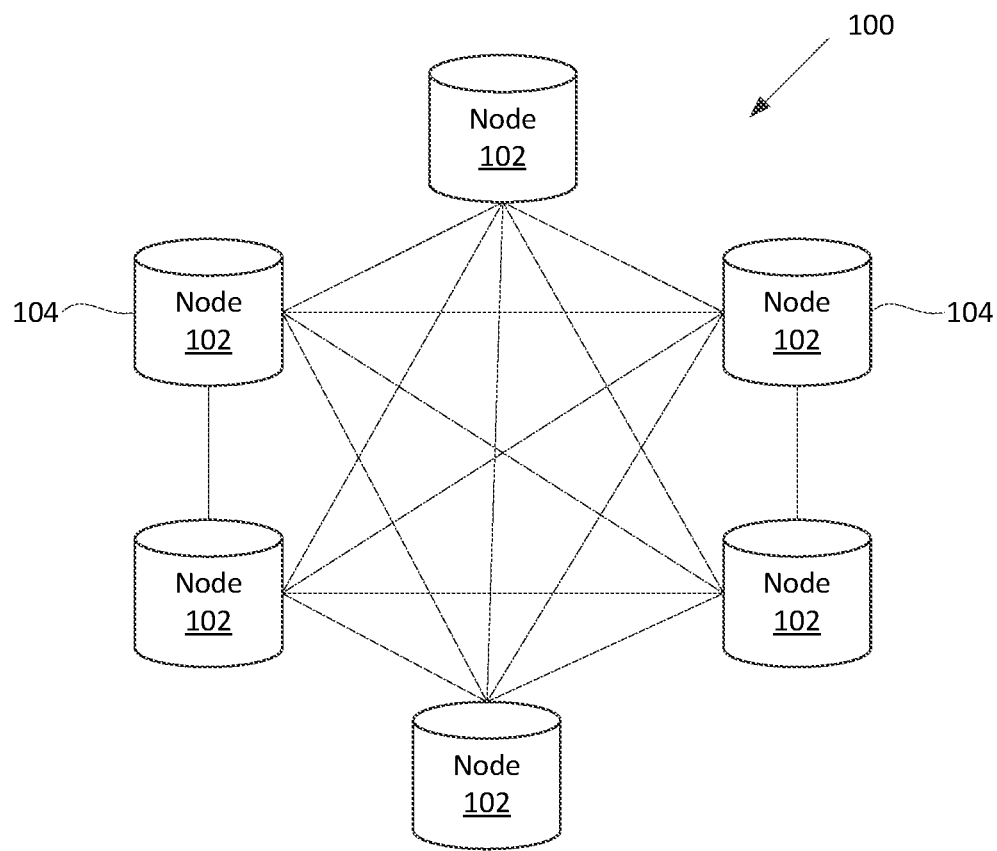
FIG. 1 illustrates a block diagram of an example blockchain network.

Reference will first be made to FIG. 1 which illustrates, in block diagram form, an example blockchain network 100 associated with a blockchain. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches, or other electronic devices.

Nodes 102 of the blockchain network 100 are coupled to one another using suitable communication technologies which may include wired and wireless communication technologies. Such communication adheres to the protocol associated with the blockchain. For example, where the blockchain is a bitcoin blockchain, the bitcoin protocol may be used.

Nodes 102 maintain a global ledger of all transactions on the blockchain. Thus, the global ledger is a distributed ledger. Each node 102 may store a complete copy or a partial copy of the global ledger. Transactions by a node 102 affecting the global ledger are verified by other nodes 102 so that the validity of the global ledger is maintained. When the blockchain is a proof-of-work based blockchain, blocks are also verified by checking the proof of work submitted with the block.

At least some of the nodes 102 operate as miners 104 of the blockchain network 100. The blockchain network 100 of FIG. 1 is a proof-of-work block chain in which miners 104 perform expensive computations in order to facilitate transactions on the blockchain. For example, the proof-of-work blockchain may require miners to solve a cryptographic problem. In Bitcoin the miners 104 find a nonce such that a block header hashes, with double SHA-256, to a number that is less than a value defined by the current difficultly. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The other nodes 102 also verify that the block itself is valid (e.g., that the transactions and block-header of the block are valid) before accepting that the block should be added to the blockchain. The block is added to the blockchain (i.e., to the distributed global ledger) by consensus of the nodes 102.

The block created by the miner 104 includes transactions which had been broadcast to the block chain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to spend the Bitcoin) by signing the request using a private key corresponding to their public key. The transfer is only added to the block if the request is validly signed.

In the case of Bitcoin, there is a one-to-one correspondence between public keys and addresses. That is, each public key is associated with a single address. Thus, any reference herein to transferring digital assets to or from a public key (e.g., paying into the public key) and transferring digital assets to or from the address associated with that public key refer to a common operation.

Some of the nodes 102 may not operate as miners and may, instead, participate as validating nodes. Validation of transactions may involve checking signature(s) (which may also be referred to herein as cryptographic signatures) or other conditions specified in a locking script, confirming reference to valid UTXO, etc.

The example of FIG. 1 includes five nodes 102, two of which are participating as miners 104. In practice, the number of nodes 102 or miners 104 may be different. In many blockchain networks, the number of nodes 102 and miners 104 may be much greater than the number illustrated in FIG. 1.

Figure 2:
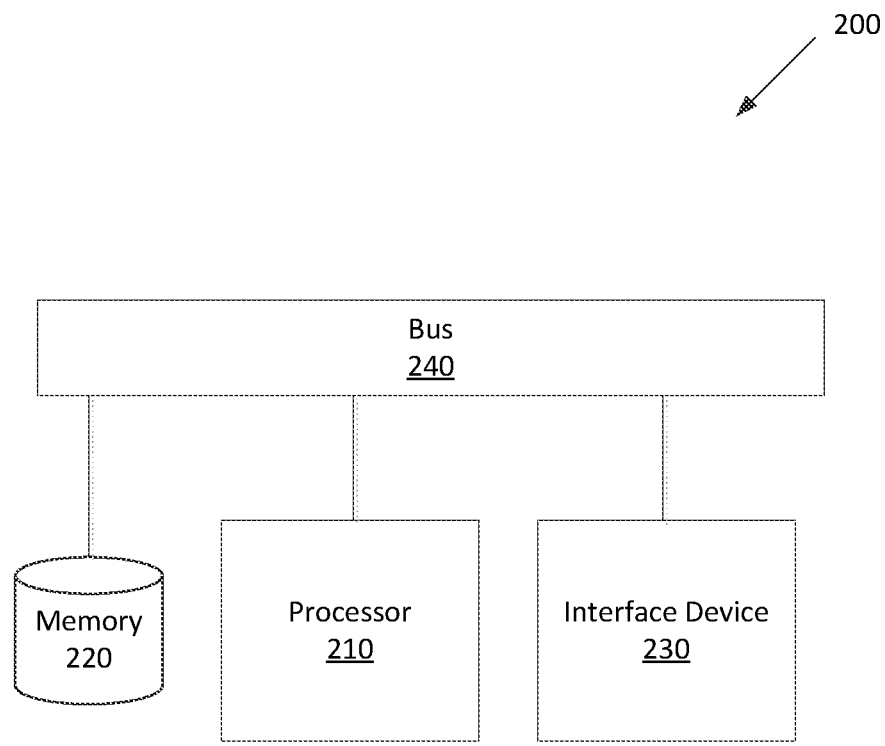
FIG. 2 illustrates a block diagram of an example electronic device which may function as a node in a blockchain network.

FIG. 2 is a block diagram illustrating components of an example electronic device 200 which may serve as a node 102 (FIG. 1) in a peer-to-peer blockchain network 100 (FIG. 1). The example electronic device 200 may also be referred to as a processing device. The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with the blockchain network 100 (FIG. 1). For example, the instructions may include instructions for implementing the Bitcoin protocol.

The memory 220 may store the global ledger of the blockchain network 100 (FIG. 1) or a portion thereof. That is, the memory 220 may store all blocks of the blockchain or a portion of the blocks, such as the most recent blocks, or a portion of the information in some blocks.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

The present invention may provide methods (and corresponding systems) arranged to modify a cryptographic public key embedded in the locking script of a blockchain transaction (Tx) using undetermined data provided in an unlocking script of another transaction. When used in conjunction with signature checking opcodes in, for example, the Bitcoin protocol (e.g. OP_CHECKSIG), which uses the transaction bytecode as a Message, both the transaction and data require approval or authorisation from the owner of the public key. This secures them from alteration. Thus, the invention provides benefits relating to security, cryptography, authorisation and transfer control.

Figure 3:
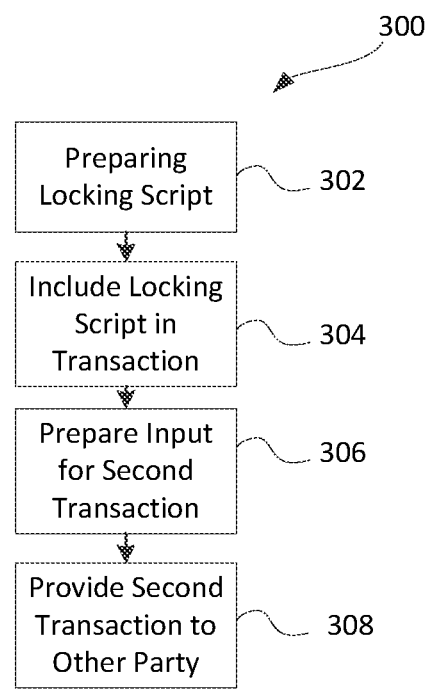
FIG. 3 is a flowchart of an example method of configuring a transaction with a locking script.

Referring now to FIG. 3, a method 300 of locking a digital asset on a blockchain network is illustrated. The method 300 may be performed by a node 102 of the blockchain network 100 (FIG. 1) to lock the digital asset based on secure undetermined data. The data is undetermined in that it need not be known to the node that configures the lock at the time the lock is configured and the data is secure in that the lock is configured such that any modification of the data by unauthorized parties will result in invalidation of the transaction. For ease of reference, the node 102 performing the method 300 may be referred to herein as a locking node. The locking node may be configured with processor-executable instructions which, when executed by a processor of the locking node, perform the method 300.

Accordingly, the undetermined data used to lock the digital asset may be data that is not yet known to the locking node at the time of the locking. This data may be data that is not yet established (such as data that is expected to be created in the future but is not yet created) or data that is known to another node but not yet available to the locking node. The data is, however, data that is expected to be available (at present or in the future) from a determined data source. The data source is determined in that the identity of the data source is known at the time the locking script is generated. In some implementations in which the locking script is configured to rely on data from a single data source (as opposed to implementations were the locking script will accept data from multiple data sources and determine which data sources will be relied upon), that data source may be referred to as a trusted data source.

The method 300 includes, at operation 302, preparing a locking script to lock a digital asset based on undetermined data. The locking script is an encumbrance, in the form of computer-executable code or instructions, placed on an output of a transaction which specifies the conditions that must be met in order to spend an output in the future. More particularly, the locking script is configured to accept data from an unlocking script and to perform certain operations based on the data so that a validating node may determine whether the unlocking script successfully unlocks the locking script.

The locking script may define one or more data constraints. Data constraints are requirements that the data provided in the unlocking script must satisfy for the locking script to be successfully evaluated (e.g., to evaluate to TRUE in the case of Bitcoin). Accordingly, the locking script may be configured to, at operation 302, with instructions to cause a validating node executing the locking script to evaluate data provided in an unlocking script against the data constraints. The data constraints of the locking script may define a threshold or value and a requisite relationship between data and the defined value or threshold. A comparison function may be used to cause a validating node executing the locking script based on data provided in an unlocking script to perform a comparison based on the data and the one or more values. By way of example, a data constraint may require the data to be equal to a value specified in the locking script, greater than a value specified in the locking script, less than a value specified in the locking script, not equal to a value specified in the locking script, etc. Numerous other possible data constraints may also be defined.

By way of example, in Bitcoin, the following are some of the possible example operation codes that may be included in the data constraint portion of the locking script to check that the data satisfies certain conditions. It should be noted that other operations are also possible and that the script may somehow modify the data (e.g., through multiplication, subtraction, division, addition, or another operation) before using one of the following comparison functions.

OP_GREATERTHAN, which returns a value of TRUE if a second item in a stack is greater than a top item in the stack.

OP_LESSTHANOREQUAL, which returns a value of TRUE if a second item in a stack is less than or equal to the top item.

OP_GREATERTHANOREQUAL, which returns a value of TRUE if a second item in a stack is greater than or equal to the top item.

OP_WITHIN, which returns a value of TRUE if the third item in a stack is between the second item and the first item OP_NUMEQUAL, which returns a value of TRUE if the top items in the stack are equal numbers.

OP_NUMNOTEQUAL, which returns a value of TRUE if the top two items are not equal numbers.

OP_LESSTHAN which returns a value of TRUE if the second item in the stack is less than the top item.

The locking script may also include instructions, such as a verification function, which causes a transaction containing an unlocking script which purports to unlock the locking script to be invalidated if the data constraint(s) are not satisfied by the data. By way of example, where the blockchain network is Bitcoin, the OP_VERIFY operation code may be included following the comparison function. The OP_VERIFY code checks the top of the stack and halts and invalidates the transaction if the value on top of the stack is not TRUE.

Thus, in at least some embodiments, the data constraint portion of the locking script may be in the following format:

<Script to Check Constraints>OP_VERIFY, where <Script to Check Constraints> is any script that evaluates whether data in an unlocking script satisfies one or more defined constraints and returns TRUE or FALSE based on such evaluation.

The locking script may also include computer-executable instructions which cause a validating node executing the locking script to evaluate the source of the data. For example, the locking script may require the data to be provided by a determined data source, such as a determined node, without tampering by other nodes. That is, the locking script is configured such that any such tampering will invalidate the transaction that purports to unlock the locking script.

The locking script may cause the validating node executing the locking script to verify the source of the data (provided in an unlocking script which purports to unlock the locking script) using elliptic curve finite field arithmetic. More particularly, the locking script may be configured to, when executed, cause a node to perform elliptic curve finite field arithmetic based on the data and a public key of the determined data source, which is included, by the locking node, in the locking script. That is, the locking script may be configured to cause a node executing the locking script to generate a modified public key for the determined data source based on the public key for the determined data source defined in the locking script and based on data defined in the unlocking script. The modified public key is determined by performing an elliptic curve finite field arithmetic operation based on the public key for the determined data source, which is embedded in the locking script, and based on data provided in an unlocking script. The modified public key may also be determined using multiple operations (e.g., data×data×public key, etc.).

In order to unlock the locking script, the determined data source must obtain a modified private key by performing a finite field arithmetic operation based on the data source's private key and the data. More specifically, the operation(s) that are performed on the private key corresponds to the operation(s) that the locking script is configured to perform on the public key. As with the public key, multiple operations may be performed on the private key to obtain the modified private key (e.g., data x data x private key, etc.). The modified private key is used by the determined data source to generate a signature which may be included in an unlocking script. This signature may be referred to herein as a signature from a modified private key.

To understand how similarly modifying the private key and the public key with data allows for verification of the source of the data, it is useful to consider the relationship between a private key and a public key. More particularly, an elliptic curve public key is calculated as follows:

$$D = d \times G,$$

where d is the private key, D is the corresponding public key, and G is an elliptic curve finite field generator element.

Due to the relationship between the private key and public key, when a change is made to the public key with the data a corresponding change needs to be made to the private key. Any number of ways can be used to modify the private key and public key with data as long as the operation can be decomposed into finite field addition.

By way of example, if d is original private key, d' is modified private key, D is original public key, and D' is modified public key, the modified public key and modified private key may be determined as:

$$d' = d \times \text{data}$$

$$D' = d' \times G = d \times \text{data} \times G = \text{data} \times D$$

Or, the modified public key and modified private key might be determined as:

$$d' = d + \text{data}$$

$$D' = d' \times G = (d + \text{data}) \times G = D + \text{DATA},$$

where DATA is an elliptic curve point.

While some existing blockchain networks may not include a specific operation code for performing an elliptic curve finite field arithmetic operation, an operation code may be provided for in a protocol that controls operation of the blockchain network 100 (FIG. 1) to provide such an operation. By way of example, an operation code, OP_ECPMULT could be defined which takes an encoded elliptic curve point and a number and performs elliptic curve multiplication by scalar. It outputs the result as an encoded elliptic curve point.

To carry out elliptic curve finite field arithmetic, two specific elliptic curve operations may be used:

Point addition (P+Q) is used to compute a new point on the elliptic curve as a negation of the intersection of the curve. This can be described as R=P+Q.

Point doubling (P+P) uses point addition to compute a point double of P. This can be described as R=P+P=2P.

These operations may be expressed as follows.

$$x_3 = s^2 - x_1 - x_2 \bmod p$$

$$y_3 = s(x_1 - x_3) - y_1 \bmod p$$

where $$s = \begin{cases} \frac{y_2 - y_1}{x_2 - x_1} \bmod p; & \text{if } P \neq Q \text{ (point addition)} \\ \frac{3x_1^2 + a}{2y_1} \bmod p; & \text{if } P = Q \text{ (point doubling)} \end{cases}$$

These operations may be used over arbitrary numbers to derive elliptic curve arithmetic such as elliptic curve point multiplication by scalar.

Thus, the locking script that is prepared at operation 302 of the method 300 may be configured to cause a validating node executing the locking script to check whether data provided in a corresponding unlocking script has been provided by a determined data source by obtaining a modified public key for the data source using the techniques described above. The locking script may be configured to cause the validating node to then evaluate a signature from a modified private key (i.e., a signature that is generated from a private key that has been modified based on the data). More particularly, a signature checking operation code may be included in the locking script which checks whether the signature from the modified private key corresponds to the modified public key and is, therefore, a valid signature. By way of example, the OP_CHECKSIG operation code may be used. OP_CHECKSIG pops a public key and a signature from the stack and validates the signature for the transaction's hashed data. OP_CHECKSIG returns TRUE if the values match. Thus, the instructions in the locking script that configure the validating node to evaluate the signature in the unlocking script based on the modified public key may be configured to cause the validating node to invalidate a transaction that includes an unlocking script when the signature contained in that unlocking script has not been generated using a modified private key associated with the determined data source. That is, the transaction containing the purported unlocking script is invalidated by the validating node if the signature is not generated with a modified private key that was generated by the determined data source based on a private key for the determined data source and based on the data.

By way of example, OP_CHECKSIG might be used together with an elliptic curve finite field arithmetic operation in a locking script as follows:

<PubKey D>OP_ECPMULT OP_CHECKSIG

Where PubKey D is the public key of the determined data source that is to provide the data.

A corresponding portion of an unlocking script which would successfully validate this portion of the locking script would be:

<Sig'><Data> where <Data> is the data and <Sig'> is the signature generated by the modified private key (i.e., by the private key which has been modified based on the data).

The order of the data constraint portion of the locking script and the data source checking portion of the locking script may be reversed. For example, the locking script might first cause a validation node to confirm that the data was provided by the determined data source before considering whether the data satisfies the data constraints.

The locking script may include other locking features in addition to those noted above. For example, the locking script may also require the addition another node's signature. For example, the locking script may require that a recipient of a transaction (i.e., the party that is to receive the digital assets associated with the transaction) submit a valid signature to unlock the locking script. For example, the locking script may include:

<PubKey B>OP_CHECKSIG,

Where PubKey B is the public key of the node that is the recipient of the digital assets encumbered by the locking script.

The locking script may also be configured to require the addition of a signature associated with the locking node itself before the locking script can validate to TRUE so that the digital assets are no longer encumbered by the locking script. For example, the locking script may include:

<PubKey A>OP_CHECKSIGVERIFY

Where PubKey A is the public key of the node that is the recipient of the digital assets encumbered by the locking script. OP_CHECKSIGVERIFY operates similar to OP_CHECKSIG, but it then uses OP_VERIFY to halt if OP_CHECKSIG does not evaluate to TRUE.

Furthermore, the locking script that is prepared at operation 302 may be configured to include instructions for removal of the encumbrance placed on the digital assets by the locking script after a defined time period. That is, the locking script may be configured with one or more conditions that allow the locking party to reclaim the digital assets under certain conditions. For example, the locking script may allow the locking node to reclaim the digital assets if the data, once determined, fails to satisfy the data constraints required by the locking script. For example, the locking script may be configured to allow the locking node (or any other party specified by their public key) to claim the digital assets after passage of a period of time specified in the locking script if such digital assets are not otherwise claimed during this period of time.

By way of example, the locking script may include a conditional branch with includes:

<time limit> OP_CHECKSEQUENCEVERIFY
<PubKey A> OP_CHECKSIG

Where <time limit> is a time period embedded in the locking script and OP_CHECKSEQUENCEVERIFY is an operation code which only allows a certain pathway to be executed if the output being spent is at least as old as the specified time period. If, for example, <time limit> were set to ten (10) days, the locking node (which has a private key corresponding to the public key <PubKey A> could reclaim the output after 10 days has elapsed by providing a signature signed with the private key for the locking node.

Thus, the locking script may include numerous conditions which must be satisfied for unlocking. While the locking script may take many forms, following is an example of a possible script that might be used:

```
OP_IF
   <PubKey A> OP_CHECKSIGVERIFY
   OP_DUP <90> OP_GREATERTHAN OP_VERIFY
   <PubKey C> OP_ECPMULT OP_CHECKSIGVERIFY
   <PubKey B> OP_CHECKSIG
OP_ELSE
   <10 Days> OP_CHECKSEQUENCEVERIFY
   <PubKey A> OP_CHECKSIG
OP_ENDIF
```

The example locking script allows a locking node, A, to require data from a determined data source, C, to be greater than 90. Further, the locking script requires that the determined data source attest to the source of the data by providing a signature generated from a modified private key (i.e., from a private key modified based on the data). The example locking script also requires that both the locking node A and another node, B, which may be the recipient of the digital assets in the transfer, to both provide a valid signature in an unlocking script.

The example locking script include multiple branches, one of which allows the locking node, A, to reclaim the digital assets encumbered by the locking script if they are not otherwise claimed within 10 days.

The example locking script could, for example, be used by a locking node, A, associated with one party to reward another node, B, associated with another party to reward that node, B, if the determined data source, C, provides data exceeding 90. The data could, for example, be a test result in the form of a mark or grade and the determined data source could be a teacher. In such cases, the node, B, may be associated with the party who received the mark or grade at issue and the node A may be associated with a party wishing to reward the party who received the mark or grade if the mark or grade is satisfactory.

The locking script prepared at operation 302 is included in a blockchain transaction by the locking node. That is, the locking node may embed the locking script into the output of a blockchain transaction (at operation 304 of the method 300) to encumber (i.e., lock) a digital asset associated with the transaction. The transaction is sent, by the locking node, to the blockchain network 100 (FIG. 1). That is, the transaction including the locking script may be broadcast to the blockchain network 100 (FIG. 1). Provided certain criteria are satisfied, such as inclusion of a sufficient mining fee, the transaction (which may be referred to as a first transaction or a first blockchain transaction) is added to a block generated by a miner 104 (FIG. 1) on the blockchain network 100 (FIG. 1). The locking node may wait until the block is mined onto the blockchain and confirmed.

At operation 306, the locking node may prepare a transaction input for a further blockchain transaction (which may be referred to as a second transaction or a second blockchain transaction) which spends the digital assets included as an output in the first transaction. That is, the transaction may include the UTXO associated with the first transaction as an input to the second transaction. The locking node may generate a signature based on the locking node's private key and may include that signature in the unlocking script of the second transaction. The locking node may also include, as an input to the transaction, a branch trigger which is used to trigger operation of a specific one of the conditional branches in the locking script. For example, the example locking script described above includes two conditional branches—a first conditional branch allows another party, B, to claim the digital assets involved in the first transaction and a second conditional branch allows the locking node to reclaim such digital assets if they are not otherwise claimed by B within a specified time period. In order to cause the unlocking script of the second transaction to trigger the first branch rather than the second, the locking node may include a "1" as an input to the transaction so that OP_IF evaluates to TRUE causing the first branch to be executed.

The signature for the locking node is added in a manner that allows other nodes to add to the transaction without requiring the locking node's approval. For example, the signature may be added as SIGHASH_NONE| SIGHASH_ANYONECANPAY. SIGHASH_ANYONECANPAY is a signature hash type that signs only the current input and SIGHASH_NONE is a signature hash type that only signs the inputs, allowing anyone to change the outputs without requiring the locking node's permission.

Thus, at operation 306, the locking node may generate a signature and add it to a transaction, configure the transaction to allow another party to add inputs and outputs, and add a branch trigger to the transaction to trigger operation of a particular conditional branch of the locking script.

The locking node may (at operation 308) provide the second transaction prepared at operation 306 to another node for another party, such as the party, B, or to the determined data source, C.

Figure 4:
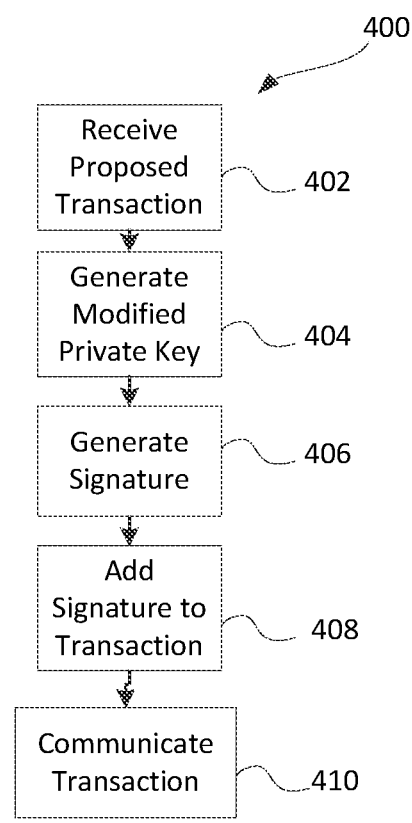
FIG. 4 is a flowchart of an example method of configuring a proposed transaction with a signature required by a locking script.

Referring now to FIG. 4, a method 400 of facilitating the unlocking of a digital asset on a blockchain network is illustrated. The method 400 may be performed by a node 102 of the blockchain network 100 (FIG. 1) or by another electronic device which may not take part in the blockchain network 100. The node 102 performing the method 400 may be referred to as a determined data source. The determined data source may be configured with processor-executable instructions which, when executed by a processor of the determined data source, perform the method 400.

At operation 402, the determined data source may receive a proposed transaction, which may be the transaction prepared by the locking node at operation 306 of the method 300. That is, the transaction is a transaction that references one or more digital assets encumbered (i.e., locked) by a locking script.

At operation 404, the determined data source generates a modified private key based on the private key for the determined data source and data that will be provided by the determined data source in the blockchain transaction. The modified private key is generated using the techniques described above. For example, the modified private key may be generated by modifying the private key with the data using an operation that corresponds to the operation defined in the locking script to generate a modified private key. Thus, the operation 404 may be of a type described above with reference to FIG. 3. For example, the modified private key may be determined by performing a finite field arithmetic operation on the private key and the data. For example, the finite field arithmetic operation may perform multiplication.

At operation 406, a signature for the proposed transaction is generated using the modified private key. This signature is added to the transaction together with the data itself at operation 408. The signature may be added in a manner that allows other nodes to add to the transaction without requiring the approval from the determined data source. For example, the signature may be added as SIGHASH_NONE-|SIGHASH_ANYONECANPAY.

At operation 410, the determined data source communicates the transaction to another node. For example, the determined data source may pass the proposed transaction to another node, B, that is associated with a public key specified in the locking script which the unlocking script of the transaction is intended to unlock. This other node may add a further signature generated based on the private key for this other node and may also add outputs specifying how the digital assets associated with the transaction are to be spent. This other node may broadcast the transaction (which may be referred to as the second transaction) to the blockchain network 100 (FIG. 1).

For the blockchain transaction (which may be referred to as a second transaction) to be added a block that is accepted into the blockchain, the inputs of the transaction which comprise the unlocking script of the transaction must successfully unlock the locking script of a first transaction (i.e., the transaction prepared at operation 304 of the method 300).

Figure 5:
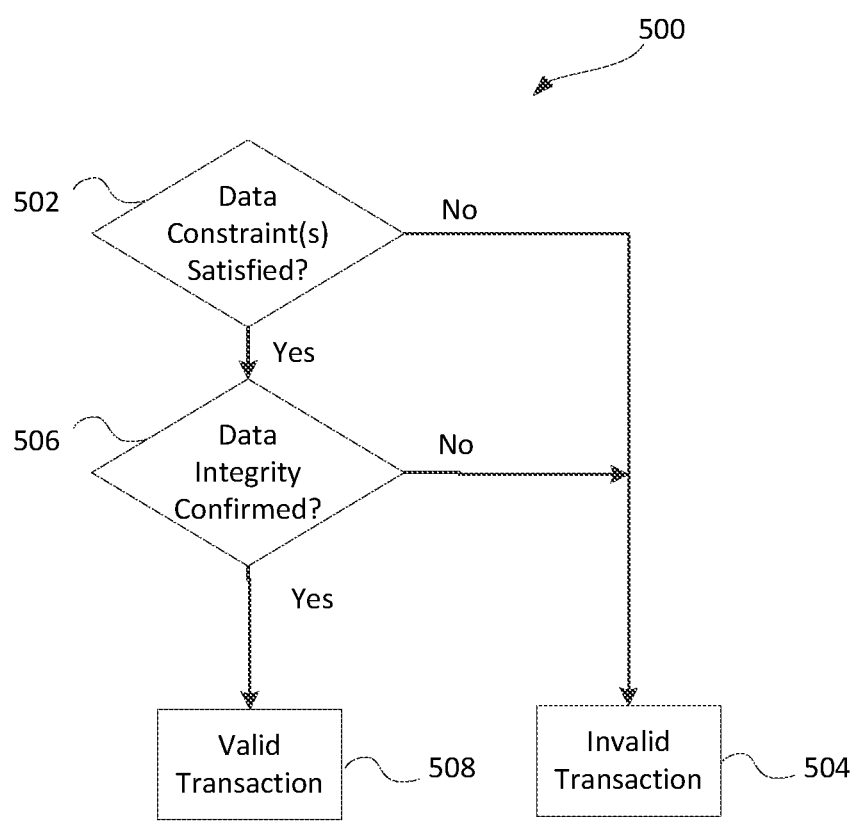
FIG. 5 is a flowchart of an example method of validating a transaction associated with a digital asset locked by a locking script.

Reference will now be made to FIG. 5 which illustrates, in flowchart form, an example method 500 that may be performed by a node 102 of the blockchain network 100. The node performing the method may be referred to as a validating node since that node validates a blockchain transaction (i.e., the second transaction, which is the transaction containing the unlocking script purporting to unlock a locking script of a first transaction) to determine whether the transaction should be added to a blockchain distributed ledger. The validating node may be a miner 104 or it may be a validating node which does not mine but simply validates blocks proposed by miners 104 or transactions not yet mined into blocks.

The validation node executes an unlocking script (defined in the second transaction) together with the corresponding locking script (defined in a first transaction) to determine whether the blockchain transaction (i.e., the second transaction) is valid. More particularly, the unlocking script in each input of the transaction may be executed alongside the locking script to determine if it satisfies a spending condition defined by the locking script.

For example, the unlocking script may be executed first using a stack execution engine. When the unlocking script successfully executes without an error, the main stack may be copied by the validating node and the locking script may then be executed. If the unlocking script evaluates to TRUE, then the unlocking script has satisfied the spending condition defined by the locking script. The blockchain transaction is then determined to be valid and the transaction may be written to the blockchain if certain other conditions are satisfied (such as a mining fee sufficient to have the transaction included by a miner in a new block).

The operations of the method 500 are, therefore, defined by computer-executable instructions in the locking script. The method 500 may, therefore, include any features of the locking script described above.

At operation 502, the validating node evaluates data provided in the unlocking script to determine whether the data satisfies one or more constraints defined in the locking script. Example data constraints are described above with reference to FIG. 3.

If the validating node determines that the data does not satisfy the requisite data constraints, then at operation 504 the validating node determines that the unlocking script is not a valid solution to the locking script. The validating node then acts to prevent the blockchain transaction containing the unlocking script (i.e., the second transaction) from being added to the blockchain. For example, if the node is a miner 104 (FIG. 1), the node excludes the transaction from a next block prepared by that miner 104.

At operation 506, the validating node evaluates the source of the data. More particularly, the locking script executed by the validating node causes the node to determine a modified public key for the determined data source. The modified public key is determined by performing an elliptic curve finite field arithmetic operation on the public key for the determined data source which is embedded in the locking script and also based on data provided in an unlocking script. Then a signature checking function is called to determine whether the modified public key corresponds to a signature generated based on a modified private key. This operation is described in greater detail above in the description of the locking script. The signature is provided in the unlocking script. If the signature is determined to invalid, then the validating node determines, at operation 504, that the unlocking script is not a valid solution to the locking script.

If the data is determined to satisfy the data constraints and if the data is determined to be valid (i.e. if it is determined that it has been generated by or provided by the determined data source without subsequent tampering), then the transaction may be determined to be valid at operation 508 (provided any other possible requirements of the locking script are also satisfied). The transaction may then be mined onto the blockchain.

While the method 500 of FIG. 5 illustrates a verification method that generally confirms that data satisfies one or more defined constraints and that the data has not been tampered with, the verification method may include other criteria that is evaluated before the locking script evaluates to TRUE (i.e., before the transaction is determined to be valid).

Other operations may be performed such as those described in the example locking scripts discussed above. For example, the validating node may determine whether other nodes associated with public keys specified in the locking script have validly signed the locking transaction including the unlocking script. As noted in the discussion of FIG. 4 above, these other nodes may be, for example, the locking node (i.e., the node that generated the locking script), a recipient node (i.e., a node that was intended to be the recipient of digital assets referenced in the transaction that included the locking script), or another node. Any failure of any of these validating operations may cause failure of validation.

The method 500 may also include, prior to performing operations 502 and 506, determining that a branch trigger has been included in the unlocking script which triggers a branch of the locking script which defines operations 502 and 506. Operations 502 and 506 may only be performed when triggered by the branch trigger.

It may also be noted that the order of operations 502 and 506 may be reversed. That is, the source of the data may be confirmed by the validating node before confirming that the data satisfies the defined constraint(s).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
including, by a node in a blockchain network, a locking script in a blockchain transaction to lock a digital asset associated with the blockchain transaction, the locking script including a public key for a determined data source, wherein the determined data source provides data that was unknown at the time a previous blockchain transaction was created, and including instructions to cause a validating node executing the locking script to verify that the determined data source is the source of data that was previously unknown and that is provided in an unlocking script of the blockchain transaction by: a) generating a modified public key based on the public key for the determined data source and based on data defined in the unlocking script; and b) evaluating a cryptographic signature in the unlocking script based on the modified public key;
sending, by the node, the blockchain transaction to the blockchain network;
wherein the locking script further defines one or more data constraints and wherein the locking script further includes instructions to cause the validating node to invalidate a blockchain transaction that includes the unlocking script when the one or more data constraints are not satisfied by the data; and
wherein the one or more data constraints define one or more values and a comparison function that performs a comparison based on the data and the one or more values.

2. The computer-implemented method of claim 1, wherein the instructions that configure the validating node to evaluate the cryptographic signature in the unlocking script based on the modified public key are configured to cause the validating node to invalidate the blockchain transaction that includes the unlocking script when the cryptographic signature has not been generated using a modified private key associated with the determined data source, and wherein the modified private key is generated by the determined data source based on a private key for the determined data source and based on the data.

3. The computer-implemented method of claim 2, wherein the instructions configure the validating node to generate the modified public key by performing an operation that corresponds to an operation used to generate the modified private key.

4. The computer-implemented method of claim 2, wherein the modified private key is a key that has been generated by performing a finite field arithmetic operation based on the data and the private key for the determined data source.

5. The computer-implemented method of claim 4, wherein the instructions are configured to cause the validating node executing the locking script to generate the modified public key by performing an elliptic curve finite field arithmetic operation based on the data and the public key for the determined data source.

6. The computer-implemented method of claim 5, wherein the elliptic curve finite field arithmetic operation performs elliptic curve multiplication by scalar.

7. The computer-implemented method of claim 1, wherein the locking script is further configured to include instructions for removal of the lock on the digital asset by the node after a defined time period.

8. A non-transitory computer readable storage medium comprising computer-executable instructions that, when executed, configure a processor to perform the method of:
including, by a node in a blockchain network, a locking script in a blockchain transaction to lock a digital asset associated with the blockchain transaction, the locking script including a public key for a determined data source, wherein the determined data source provides data that was unknown at the time a previous blockchain transaction was created, and including instructions to cause a validating node executing the locking script to verify that the determined data source is the source of data that was previously unknown and that is provided in an unlocking script of the blockchain transaction by: a) generating a modified public key based on the public key for the determined data source and based on data defined in the unlocking script; and b) evaluating a cryptographic signature in the unlocking script based on the modified public key;
sending, by the node, the blockchain transaction to the blockchain network;
wherein the locking script further defines one or more data constraints and wherein the locking script further includes instructions to cause the validating node to invalidate a blockchain transaction that includes the unlocking script when the one or more data constraints are not satisfied by the data; and
wherein the one or more data constraints define one or more values and a comparison function that performs a comparison based on the data and the one or more values.

9. An electronic device comprising: an interface device;
a processor coupled to the interface device; and
a memory coupled to the processor, the memory having stored thereon computer executable instructions that, when executed, configure the processor to perform the method of:
including, by a node in a blockchain network, a locking script in a blockchain transaction to lock a digital asset associated with the blockchain transaction, the locking script including a public key for a determined data source, wherein the determined data source provides data that was unknown at the time a previous blockchain transaction was created, and including instructions to cause a validating node executing the locking script to verify that the determined data source is the source of data that was previously unknown and that is provided in an unlocking script of the blockchain transaction by: a) generating a modified public key based on the public key for the determined data source and based on data defined in the unlocking script; and b) evaluating a cryptographic signature in the unlocking script based on the modified public key; and
sending, by the node, the blockchain transaction to the blockchain network;
wherein the locking script further defines one or more data constraints and wherein the locking script further includes instructions to cause the validating node to invalidate a blockchain transaction that includes the unlocking script when the one or more data constraints are not satisfied by the data; and wherein the one or more data constraints define one or more values and a comparison function that performs a comparison based on the data and the one or more values.

10. A computer-implemented method comprising:

generating, by a node, a modified private key based on data that was previously unknown at a time a previous transaction was generated and a private key;

generating a cryptographic signature for a blockchain transaction referencing digital assets locked by a locking script using the modified private key;

adding the cryptographic signature and the data to the blockchain transaction; and communicating the blockchain transaction to another node;

wherein the locking script specifies a public key for a determined data source and includes instructions to cause a validating node executing the locking script to evaluate a source of data provided in an unlocking script by: a) generating a modified public key based on the public key for the determined data source and based on data defined in the unlocking script; and b) evaluating a cryptographic signature in the unlocking script based on the modified public key;

wherein the locking script further defines one or more data constraints and wherein the locking script further includes instructions to cause the validating node to invalidate a blockchain transaction that includes the unlocking script when the one or more data constraints are not satisfied by the data; and wherein the one or more data constraints define one or more values and a comparison function that performs a comparison based on the data and the one or more values.

11. The computer-implemented method of claim 10, wherein generating a modified private key comprises performing a finite field arithmetic operation on the data and the private key.

12. The computer-implemented method of claim 10, wherein the finite field arithmetic operation performs multiplication.

\* \* \* \* \*